March 20, 1962     G. J. SEGAL     3,025,930
SELF LOCKING CASTERS
Filed Sept. 19, 1960

*INVENTOR.*
GEORGE J. SEGAL
BY
ATTORNEY

United States Patent Office 3,025,930
Patented Mar. 20, 1962

---

3,025,930
SELF LOCKING CASTERS
George J. Segal, Philadelphia, Pa., assignor to Autolok Casters, Inc., Wilmington, Del., a corporation of Delaware
Filed Sept. 19, 1960, Ser. No. 56,812
5 Claims. (Cl. 188—74)

This invention relates to self locking casters, and more particularly to self locking casters which are adjustable for locking of the caster roller at different load applications as desired.

Self locking casters have heretofore been proposed which do not have any adjustment for selection of the load application at which locking of the caster roller is attained. The range of use of such casters is necessarily limited.

Adjustable self locking casters have heretofore been proposed such, for example, as the caster shown in prior U.S. Patent No. 2,885,720. The adjustment of casters of this type heretofore available has been difficult and cannot be easily carried out with the caster in place on a piece of furniture.

It is the principal object of the present invention to provide a self locking caster which is simple in construction but easily adjustable for locking of the caster roller at a desired load application.

It is a further object of the present invention to provide a self locking caster which is locked against movement of the caster roller at selected loads.

It is a further object of the present invention to provide a self-locking caster in which the major components are metal stampings and which is easy to assemble and to adjust as desired.

It is a further object of the present invention to provide a self-locking caster which can be adjusted as to the locking load acting to lock the caster roller by a shift of position of one part thereof, the shift of position being capable of accomplishment without disassembly or disconnection and with the application of a simple lever.

Other objects and advantageous features of the invention will be apparent from the description and claims.

The nature and characteristic features of the invention will be more readily understood from the following description, taken in connection with the accompanying drawings forming part thereof, in which.

Figure 1:
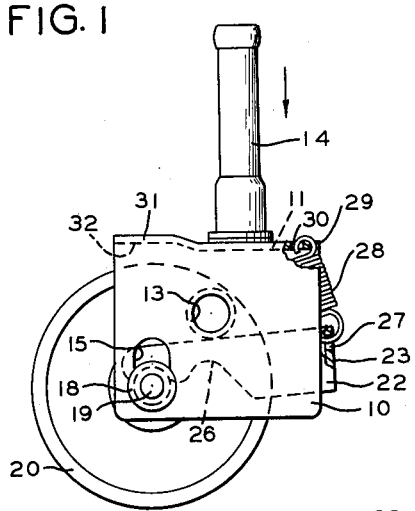
FIGURE 1 is a side elevational view of a caster in accordance with the present invention in one position of adjustment and prior to the application of a load thereon.

It should, of course, be understood, that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated, the caster includes a horn or bifurcated roller support 10 having an upper substantially horizontal wall portion 11 and integral therewith substantially rectangular parallel side wall portions 12 extending downwardly therefrom with struck in bosses 13 which provide fulcrums or pivot locations as hereinafter explained.

The upper wall portion 11 is adapted to be connected to the piece of furniture with which it is used, such as a bed or the like, in any desired manner and for this purpose a caster stem or pin 14 is provided rigidly or otherwise secured with respect to the wall portion 11. The caster stem or pin 14 is adapted for reception in a suitable socket (not shown).

The side wall portions 12 are provided with opposite vertically elongated slots 15 for the reception of a roller shaft 16. The roller shaft 16 has an enlarged head 17 exteriorly disposed on one of the wall portions 12, and a washer 18 and peened over end 19 at the end opposite the head 17.

The roller shaft 16, interiorly of the side wall portions 12, has a caster wheel 20 freely rotatably carried thereon. The caster wheel 20 can be made of any desired material, a solid molded construction of nylon being particularly suitable.

Figure 5:
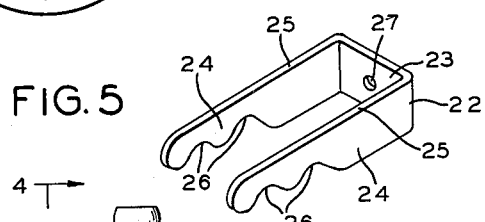
FIG. 5 is a view in perspective of a yoke employed in connection with the caster removed therefrom.

Interiorly of the horn 10 a bifurcated yoke 22 is provided, the yoke 22 being shown in detail in FIG. 5. The yoke 22 has an end wall 23, and opposite parallel side walls 24 integral therewith. The side walls 24 have top marginal faces 25 for pivotal contact with the bosses 13 and spaced notches 26 for selective engagement with the roller shaft 16 to provide the desired adjustment, as hereinafter explained.

The end wall 23 has an aperture 27 for engagement of one end of a coil tension spring 28 of selected spring rate and which is continuously in tension.

The opposite end of the spring 28 is accommodated by an end cutout 29 and aperture 30 in the upper wall portion 11.

If desired, the upper wall portion 11 can be provided with an upwardly offset locking groove 31 which is in part arcuate in a plane parallel to the main plane of the caster wheel 20 and may have a roughened interior gripping surface 32 for locking engagement by the periphery of the caster wheel 20.

The mode of use will now be pointed out.

The caster in accordance with the invention can be used with various pieces of furniture, but is particularly adapted for use with beds, being used in groups of four, one for each leg of the bed.

The make up of the bed outfit, including the particular spring and mattress, will determine the weight applied downwardly to the casters. The weight can vary over a wide range and the variation as between different spring and mattress combinations may exceed 40 pounds.

While the spring 28 can be selected with the desired spring rate in accordance with the weight to be accommodated this would not, in itself, permit of the caster functioning effectively at different loads such as would be applied with different bed outfits.

Figure 2:
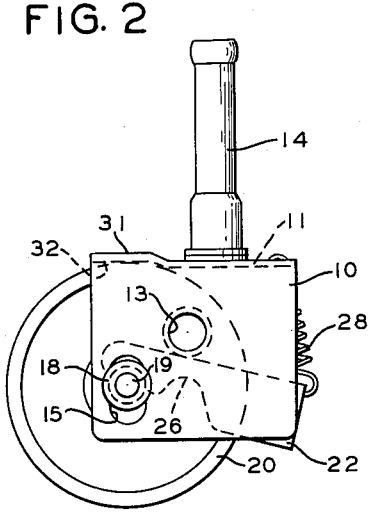
FIG. 2 is a view similar to FIG. 1 but showing the effect of applying the load and with the caster roller in locked condition.

When the yoke 22 is positioned, as shown in FIGS. 1 and 2, with the outermost notches in engagement with the roller shaft 16, the force of the spring 28 is applied with a relatively longer lever arm so that greater weight is required to overcome the force of the spring 28, to enable the periphery of the caster wheel 20 to engage the surface 32 and be held thereby.

Figure 3:
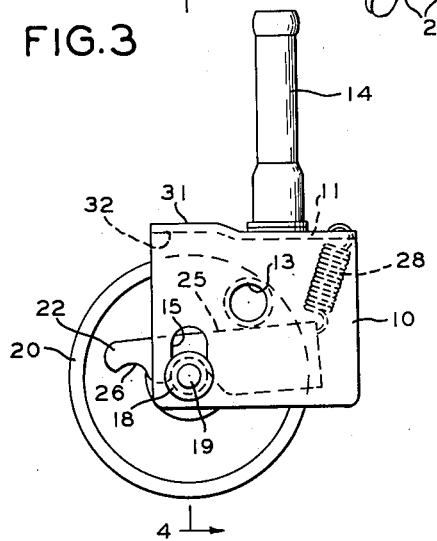
FIG. 3 is a view similar to FIG. 1 showing the caster in another position of adjustment.
Figure 4:
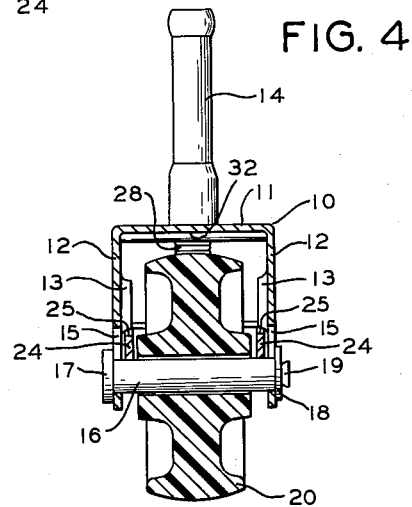
FIG. 4 is a vertical sectional view taken approximately on the line 4—4 of FIG 3.

If a lesser force is desired to lock the caster wheel 20, the yoke 22 is moved so that the inner pair of notches 26 are in engagement with the roller shaft 16, as illustrated in FIG. 3.

The effective differential is between the two settings and dependent, of course, on the spring rate of the spring 28 and on the location of the notches 26 in their relation to each other and to the location of the connection of the spring 28 to the yoke 22.

The adjustment from one position to the other can be readily accomplished. The yoke 22 can be moved manually from a position in which the outer notches 26 are in engagement to a position where the inner notches 26 are effective and moved in the opposite direction with a screw driver.

The caster of the present invention is particularly suitable for carrying out the objects previously referred to.

I claim:
1. A self-locking caster comprising a horn having an upper wall and parallel side wall portions extending downwardly therefrom, a link, members pivotally mounting said link at a selected one of a plurality of fulcrum locations with respect to said side wall portions, a caster roller, a shaft on which said roller is mounted in floating relation to the side wall portions of the horn and with the periphery of the wheel in floating relation to said upper wall, a spring interposed between the link and the horn and urging the roller to an unrestrained position with respect to said upper wall, and an adjustable connection between said link and said shaft for varying the fulcrum of said link and the effect of said spring and link on said shaft.

2. A self-locking caster comprising a horn having an upper wall and parallel side wall portions extending downwardly therefrom, a link, members pivotally mounting said link at a selected one of a plurality of fulcrum locations with respect to said side wall portions, a caster roller, a shaft on which said roller is mounted in floating relation to the side wall portions of the horn and with the periphery of the wheel in floating relation to said upper wall, and a spring interposed between the link and the horn and urging the roller to an unrestrained position with respect to said upper wall, said link along an edge thereof having a plurality of spaced portions for selective engagement with said shaft for varying the fulcrum of said link and the effect of said spring on said shaft.

3. A self-locking caster comprising a horn having an upper wall and parallel side wall portions extending downwardly therefrom, a link, members pivotally mounting said link at a selected one of a plurality of fulcrum locations with respect to said side wall portions, a caster roller, a shaft on which said roller is mounted in floating relation to the side wall portions of the horn and with the periphery of the wheel in floating relation to said upper wall, a spring interposed between the link and the horn and urging the roller to an unrestrained position with respect to said upper wall, said link along an edge portion thereof having portions for varying the positioning of the fulcrum of said link with respect to the pivotally mounting members.

4. A self-locking caster comprising a horn having an upper wall and downwardly extending parallel wall portions, a roller shaft mounted in said side wall portions for relative movement upwardly with respect thereto, a caster roller mounted on said shaft, said side walls having fulcrum portions thereon, a bifurcated yoke having legs with portions intermediate their ends for engagement at one of a plurality of selected fulcrum locations therealong with said fulcrum portions and with spaced pairs of edge notches for selective engagement with said shaft for determining the locking load. and a spring connected to said yoke for urging a selected pair of edge notches into engagement with the shaft, said upper wall having a portion for locking engagement by the periphery of said wheel when the weight applied on the caster is sufficient to overcome the force applied by said spring.

5. A self-locking caster comprising a horn having an upper wall and downwardly extending parallel side wall portions, a roller shaft mounted in said side wall portions for relative movement upwardly with respect thereto, a caster roller mounted in said shaft, said side walls having inwardly extending fulcrum portions formed thereon, a bifurcated yoke having legs with upper marginal portions intermediate their ends for engagement at one of a plurality of selected fulcrum locations therealong with said fulcrum portions and with spaced pairs of edge notches on lower marginal portions for selective engagement with said shaft for determining the locking load, and a spring connected to said yoke for urging a selected pair of edge notches into engagement with the shaft, said upper wall having a portion for locking engagement by the periphery of said wheel when the weight applied on the caster is sufficient to overcome the force applied by said spring.

References Cited in the file of this patent
UNITED STATES PATENTS

| | | |
|---|---|---|
| 1,471,997 | Clark | Oct. 23, 1923 |
| 1,589,181 | Lane et al. | June 15, 1926 |
| 2,942,290 | Segal | June 28, 1960 |